United States Patent [19]
Durrell, Jr.

[11] 3,741,146
[45] June 26, 1973

[54] AMPHIBIAN VEHICLE

[75] Inventor: Charles W. Durrell, Jr., Atlanta, Ga.

[73] Assignees: B. J. Powell, Decatur; D. W. Griffith, Doraville, Ga. ; part interest to each

[22] Filed: Feb. 3, 1971

[21] Appl. No.: 112,116

[52] U.S. Cl. ............................................. 115/1 R
[51] Int. Cl. ............................................. B60f 3/00
[58] Field of Search ............................ 115/1; 9/1

[56] References Cited
UNITED STATES PATENTS
2,994,294  8/1961  Roth .................................. 115/1 R
3,444,837  5/1969  Donofrio ........................... 115/1 R Primary Examiner—Duane A. Reger
Assistant Examiner—E. R. Kazenske
Attorney—B. J. Powell

[57] ABSTRACT

An amphibian vehicle comprising a wheeled vehicle with a floatable body shell, a pair of pontoons disposed on opposited sides of the wheeled vehicle and linkage means connecting the pontoons to the vehicle. The linkage means is capable of selectively positioning the pontoons directly below the wheels or above the wheels and for connecting the pontoons to the vehicle through its normal suspension system. Each pontoon carries a propulsion means for driving the vehicle through the water.

9 Claims, 7 Drawing Figures

INVENTOR
CHARLES W. DURRELL, JR.
BY: B J Powell
ATTORNEY

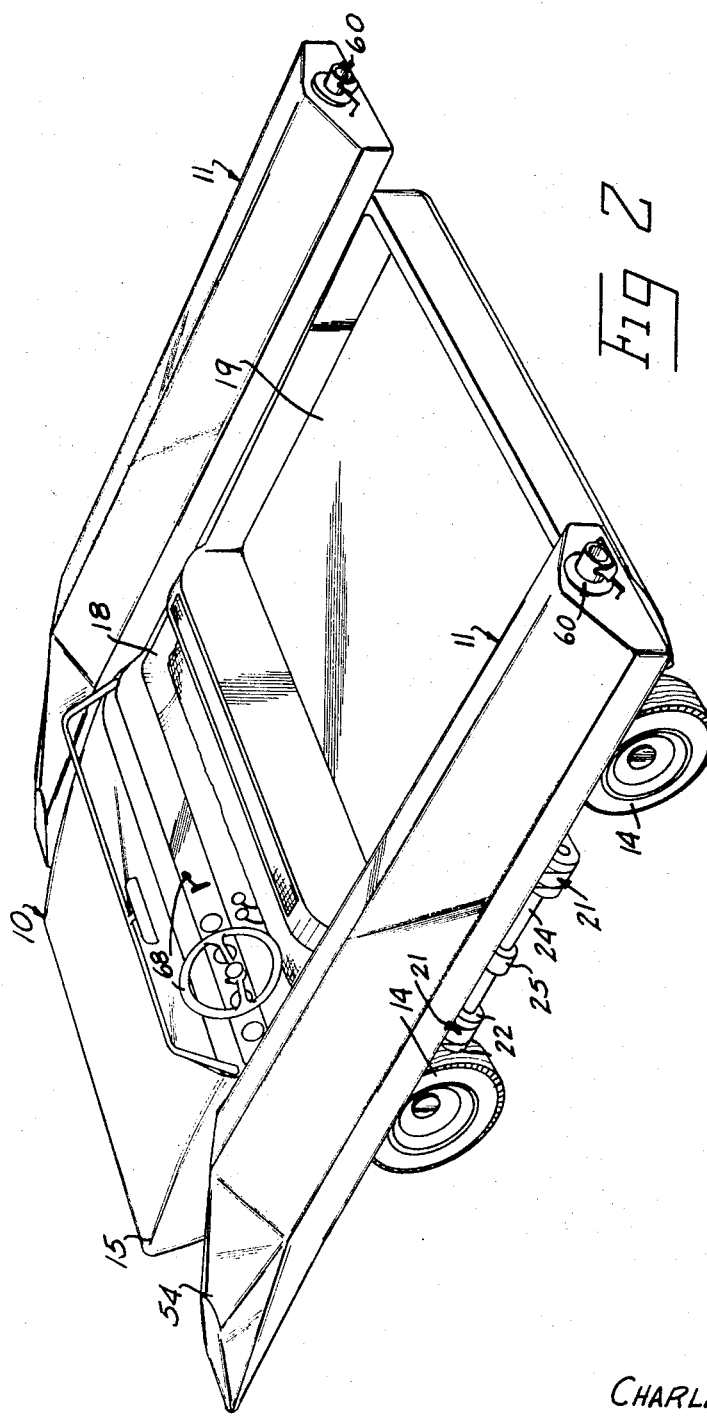

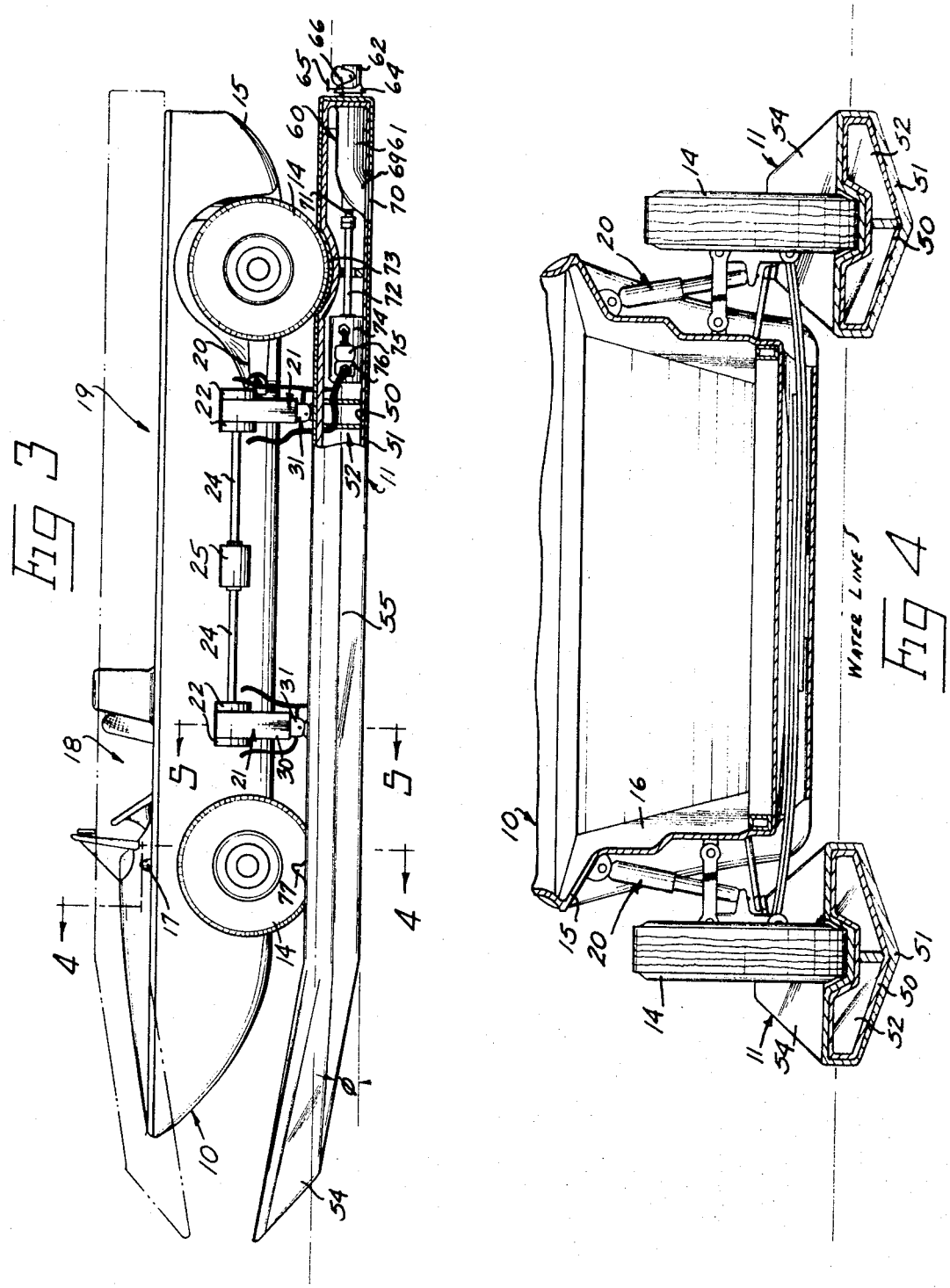

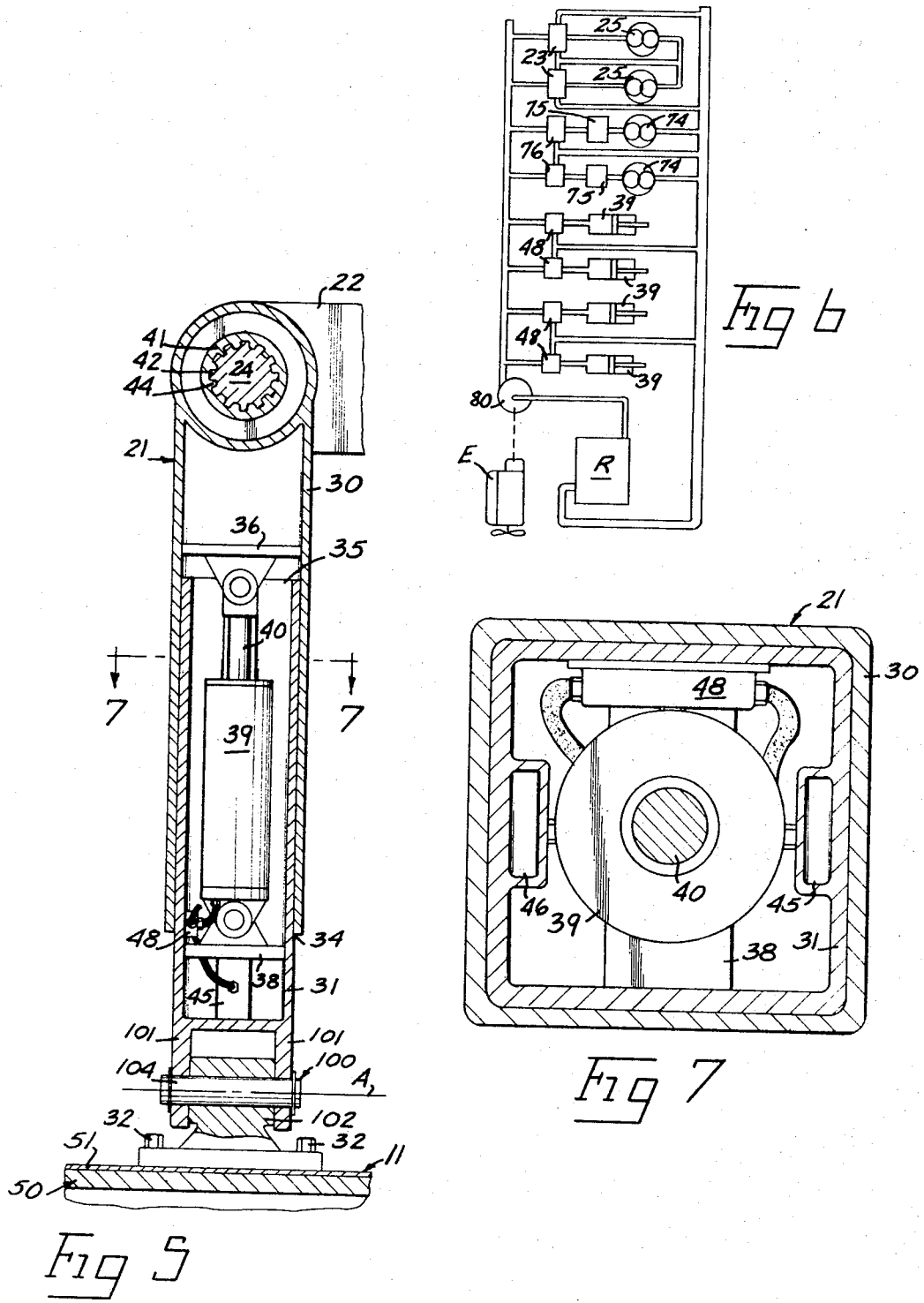

AMPHIBIAN VEHICLE

BACKGROUND OF THE INVENTION

Amphibian vehicles with pairs of pontoons on opposite sides of the vehicle which can be lowered into the water to support the vehicle are available on the market today. Usually, these vehicles require a heavy support structure to connect the pontoons to the main wheeled vehicle thus requiring excess power to drive the vehicle through the water. Also these vehicles usually had several protrusions that extended below the water level at least when the vehicle was at rest. These protrusions prevented relative high operating speeds because it was very difficult to achieve a planing speed.

Moreover, because the linkage connecting the pontoons to the main vehicle frame generally had no substantial shock absorbing capabilities, the shock forces normally encountered when traveling on water are transmitted to the vehicle frame and thus to the passengers in the vehicle. This results in quickly tiring the passengers on any substantial traveling time over the water unless the speed of the vehicle is drastically reduced.

Because the prior art vehicles required heavy duty linkages connecting the pontoons with the vehicle, the manufacturing cost thereof was prohibitive as well as the maintenance cost. Also, because the center of gravity of these vehicles was substantially above the water level, these vehicles were generally unstable for marine use.

SUMMARY OF THE INVENTION

These and other problems and disadvantages associated with the prior art are overcome by the invention disclosed herein by providing an amphibian vehicle which is easily planable with no protrusions extending into the water to create a substantial drag. Moreover, the pontoons supporting the vehicle in the water are connected to the vehicle through its conventional wheel suspension system to produce a comfortable ride while at the same time reducing the weight of the structure necessary to maintain the vehicle on the pontoons and lowering the center of gravity of the vehicle with respect to the water. The pontoons are designed so that the vehicle acts as a catamaran to produce stable marine operation.

The amphibian vehicle is a four wheeled vehicle having a floatable body shell. A pair of pontoons are disposed on opposite sides of the body shell and are pivoted to the vehicle frame through a linkage arrangement. The linkage arrangement is selectively extendable so that the pontoons may be placed under the wheels and then the linkage arrangement released so that the wheels rest on the pontoons. In this manner the pontoons are connected to the vehicle through the wheel suspension system in order that the vibrations to which the pontoons are subjected will be absorbed by the suspension system.

These and other features and advantages of the invention will become more clearly understood upon consideration of the following drawings wherein like characters of reference designate corresponding parts throughout the several views and in which:

BRIEF DESCRIPTION OF THE DRAWINGS

FIG. 2 is a perspective view similar to FIG. 1 showing the pontoons raised for land use;

FIG. 3 is a side elevational view of that embodiment of the invention shown in FIGS. 1 and 2;

FIG. 4 is a cross-sectional view taken along line 4—4 in FIG. 3;

FIG. 5 is a cross-sectional view taken along line 5—5 in FIG. 3;

FIG. 6 is a fluid schematic for the invention; and,

FIG. 7 is a cross-sectional view taken along line 7—7 in FIG. 4.

Figure 1:
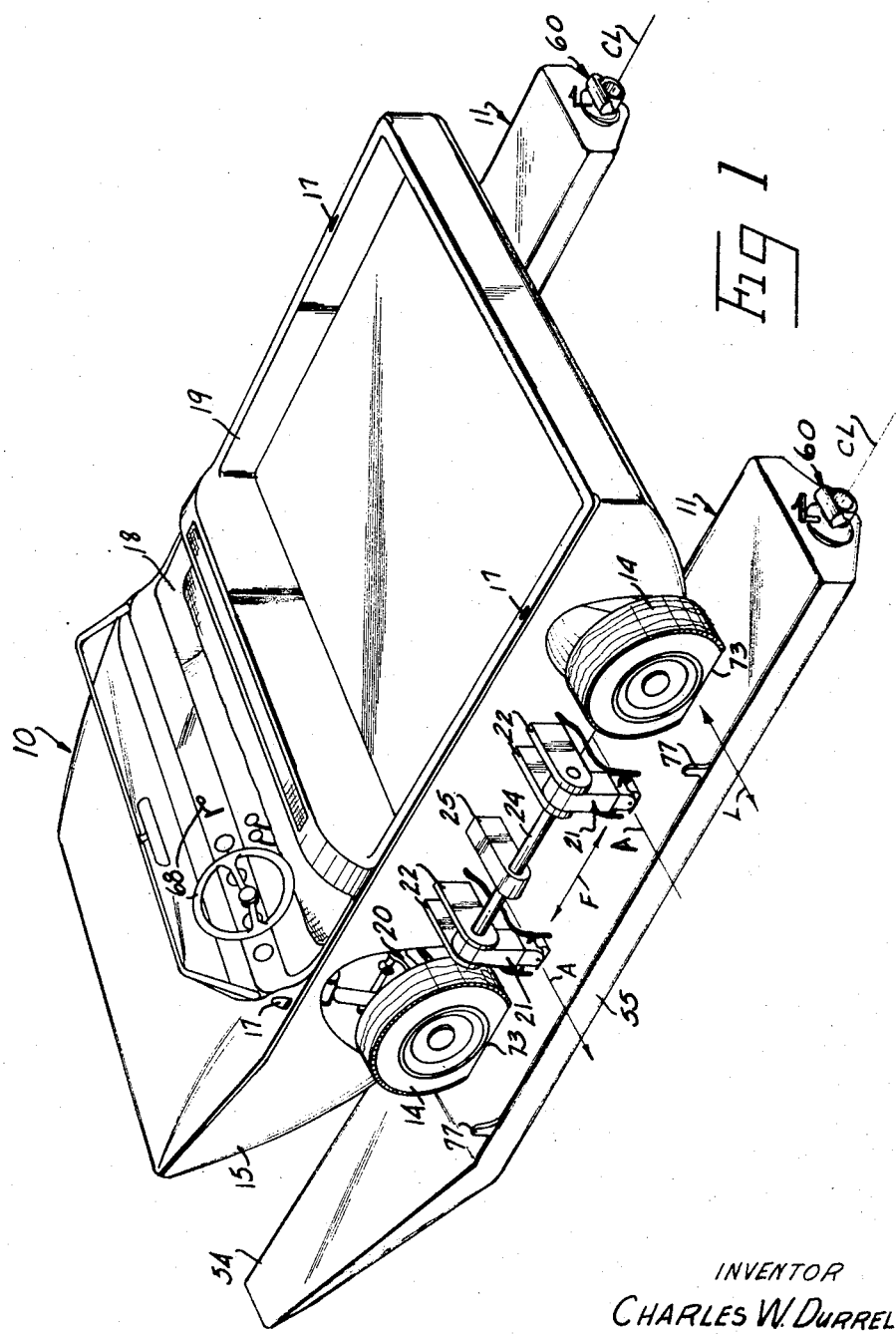
FIG. 1 is a perspective view of one embodiment of the invention with the pontoons lowered for marine use.

These figures and the following detailed description disclose specific embodiments of the invention, however it is to be understood that the invention concept is not limited thereto since it may be embodied in other forms.

DETAILED DESCRIPTION OF ILLUSTRATIVE EMBODIMENTS

Referring to the figures, the amphibious vehicle includes a four-wheeled vehicle 10, a pair of pontoons 11 and a linkage means 12 for positioning the pontoons 11. The linkage means 12 connects the pontoons to the frame of the vehicle 10 and is capable of selectively positioning the pontoons 11 above and below the wheels of the vehicle 10.

The vehicle 10 includes four wheels 14, has a conventional engine E (shown schematically in FIG. 6) and has a floatable body shell 15 carried by frame 16 as best seen in FIG. 4. The underside of body shell 15 is contoured in a streamlined manner to allow for ease of movement through the water. The body shell 15 may have a variety of shapes as long as it is capable of floating the vehicle 10, but is shown here in the form of a work vehicle with a passenger compartment 18 and a truck bed 19.

The suspension system 20 connecting the wheels 14 with frame 16 is of conventional four-wheel independent design. It is to be understood, however, that various suspension system designs may be used.

As seen in FIGS. 1–4, the linkage means 12 include two pairs of telescoping arms 21, one pair of arms connecting one pontoon 11 to frame 16 and the other pair connecting the other pontoon 11 to the frame 16. That end of each arm 21 adjacent frame 20 is pivotally connected thereto by a pair of hinge ears 22, there being a separate pair of hinge ears 22 for each arm 21. Each pair of arms 21 are attached to and movable with a shaft 24 rotatably mounted in hinge ears 22 and selectively rotated by fluid motor 25.

Referring now to FIG. 5, each of the arms 21 has the same construction so that only one arm 21 will be described in detail. The arm 21 can be extended to allow for the pivoting of the pontoons 11 from below the wheels 14 as seen in FIG. 1 of marine use to above the wheels 14 for land use as will be explained.

Arm 21 consists of two tubular members 30 and 31 with member 30 being mounted on pontoon 11 by fasteners 32. Members 30 and 31 are sized so that the open end 34 of member 30 will slidably receive the open end 35 of member 31. Member 30 is provided with a mounting bracket 36 on the inside thereof while member 31 is provided with a complementary bracket 38 on the inside thereof. A fluid cylinder 39 is pinned to bracket 38 and has its piston rod 40 pinned to bracket 36 so that as the rod 40 is extended and retracted the arm 21 can be extended and retracted to move the pontoons 11 as will be explained.

That end of member 30 between hinge ears 22 is provided with a boss 41 through which the shaft 24 extends. Shaft 24 is externally splined at 42 to engage the complementary internal splines 44 in boss 41 so that, as shaft 24 is rotated by motor 25, the arm 21 will be pivoted at hinge ears 22 as will be explained.

A pair of fluid manifolds 45 and 46 are provided on opposite sides of the inside of member 31 as seen in FIG. 7 with manifold 45 being connected to the high pressure side of the fluid system H as seen in FIG. 6 and with manifold 46 being connected to the low pressure side of the fluid system H as seen in FIG. 6. Manifold 45 or manifold 46 may be selectively connected to cylinder 39 through valve 48 as seen in FIGS. 5 and 7 to selectively extend or retract piston rod 40 as will be explained.

Referring to FIGS. 1–4, the pontoons 11 are attached to arms 21 so that fore and aft movement of pontoons 11 along line F as well as lateral movement along line L is prevented, yet the pontoons can pivot about a horizontal axis A perpendicular to line F. This connection is provided through a pivot joint 100 as best seen in FIG. 4.

Each pivot joint 100 includes a pair of depending ears 101 on the lower end of member 31 and an upstanding bracket 102 attached to pontoon 11 by fasteners 32. Ears 101 are pivotally connected to bracket 102 through pivot pin 104 journalled in bracket 102. The centerline of pivot pin 104 lies along axis A.

Pontoon 11 has an internal framework 50 as seen in FIG. 3 which defines the shape of the pontoon. The framework 50 is covered by a watertight skin 51 so as to define a hollow chamber 52 in the pontoon 11. The forward end 54 of the pontoon 11 is tilted upwardly at angle $\phi$ with respect to the main body 55 thereof. This causes the pontoon 11 to tend to quickly rise out of the water to a planing position. Both the forward end 54 and main body 55 have a V-shaped configuration to add stability to the vehicle when it reaches a planing position as will be explained.

Mounted in the rear end of each pontoon 11 is a propulsion means 60. While it is to be understood that various propulsion means 60 may be used, the propulsion means 60 is illustrated as a water jet 61 mounted in the rearmost portion of chamber 52 with its selectively movable discharge nozzle 62 protruding from the rear end of pontoon 11 through a sealed connection 64. The steering mechanism 65 and reverse mechanism 66 are connected to appropriate controls 68 (see FIG. 1) in the passenger compartment 18 to allow the operator to control same. The intake 69 of jet 61 is connected to an opening 70 in the bottom of pontoon 11 for supplying water to the jet 61.

The drive shaft 71 of jet 61 is connected to the output shaft 72 of a fluid motor 74. Fluid motor 74 may be selectively connected to the fluid system H best shown in FIG. 6 through valve 75. The speed of motor 74 may be selectively controlled by speed control valve 76 activated from passenger compartment 18.

Referring more particularly to FIG. 6, the fluid system H includes a fluid pump 80 selectively driven by the engine E. The output of pump 80 is selectively connected through valves 48 to cylinders 39, through valves 23 to fluid motors 25, and through valves 75 and 76 to motors 74. Valves 48 selectively connect the inlet port of cylinders 39 to the high pressure side of system H or to the low pressure return side to reservoir R of system H. Valves 23 selectively connect motors 21 to the system so as to rotate the shafts 24 connected thereto in either direction or to lock the motors 21 to prevent rotation of shafts 24. Valves 75 selectively connect motors 74 to the system to cause both motors 74 to rotate in the same directions while valves 76 may be used in addition to driving pump 80 at variable speeds with engine E to control the speed of motors 74.

OPERATION

In operation, the invention will be used over land with the pontoons 11 in a raised position as seen in FIG. 2 and in the water with the pontoons 11 in a lowered position as shown in FIG. 1.

With the pontoons 11 raised, the invention is operated as a conventional land vehicle. The pontoons 11 serve as fenders during this operation. The cylinders 39 are connected to the low pressure return side of fluid system H so that the weight of the pontoons 11 cause the piston rods 40 to retract and the hooks 77 on pontoons 11 as seen in FIGS. 1 and 3 to the lowered into the receptacles 17 in body 15 to support the pontoons 11. In this condition, vehicle 10 is operated with the fluid system H disconnected and wheels 14 driven in conventional manner.

To convert the vehicle to use on the water, it is first driven into the water so that body 15 floats. The fluid system H is then connected to the engine E and the conventional drive system disconnected. Valves 48 are then operated to connect the cylinders 39 to the high pressure side of fluid system H. This causes piston rods 40 to extend and telescope arms 21 to raise the pontoons 11 and release the hooks 77 from receptacles 17.

Valves 23 are then activated to cause the motors 25 to rotate arms 21 and pontoons 11 to a position in which the wheel depressions 73 formed in the upper surface of the pontoons 11 lie directly under the wheels 14. The pontoons can be moved to this position because the arms 21 are extended sufficiently for the pontoons to clear the wheels 14. Valves 48 are then operated to connect the cylinders 39 to the low pressure side of fluid system H. This allows the force of the water on the pontoons 11 to force the fluid from cylinders 39 and retract arms 21 until the wheels 14 rest in the depressions 73 in the pontoons.

Since the pressure in cylinders 39 is relieved, the pontoons 11 can move up and down with wheels 14. Thus, it will be seen that while the fore and aft position of the pontoons 11 is maintained by arms 21, the shock of the uneven water forces on the pontoons 11 is absorbed in the vehicle suspension system 20 as the vehicle moves through the water. It will also be noted that the centerline CL of each pontoon 11 is vertically aligned with a line connecting the front and rear wheels 14 with which it is associated to reduce the tendency of the pontoons 11 to tilt from side to side but are allowed to pivot about the axes A as the wheels 14 are individually moved.

The valves 75 are then activated to propel the vehicle 10 through the water. Both valves 76 and the speed of engine E with pump 80 can be used to vary the propulsion force of the propulsion means 60.

To return the pontoons to their up position for land use, the valves 48 are activated to extend arms 21, the valves 23 activated to rotate motors 25 and the valves 48 again activated to allow arms 21 to be retracted. The propulsion means 60 may be operated during the raising operation to push the wheels 14 into contact with land.

While specific embodiments of the invention have been disclosed herein, it is to be understood that full use may be made of modifications, substitutions and equivalents without departing from the scope of the inventive concept.

I claim:

1. An amphibian vehicle comprising a wheeled vehicle, a pair of pontoons disposed on opposite sides of said wheeled vehicle; and linkage means connecting said pontoons to said wheeled vehicle for alternatively moving said pontoons to a position directly below said wheels and to a position out from under said wheels so that said wheels are in a ground engaging position, said linkage means including selectively extendable arm means attached to each of said pontoons and pivotally connected to said wheeled vehicle, said arm means allowing said wheels to rest on the upper portion of said pontoons to support said vehicle through its normal suspension system, while at the same time preventing movement of said pontoons fore and aft with respect to said vehicle, means for selectively extending said arm means, and drive means for selectivley pivoting said arm means.

2. An amphibian vehicle as set forth in claim 1 wherein said pontoons include hook means for connecting said pontoons to said vehicle when said pontoons are in said position out from under said wheels and said arm means are retracted, and second means for connecting said pontoons to said wheeled vehicle through said suspension system when said pontoons are in said position below said wheels and said arm means are retracted.

3. An amphibian vehicle as set forth in claim 1 wherein said wheeled vehicle includes a floatable body shell.

4. An amphibian vehicle as set forth in claim 2 further including propulsion means mounted at the aft end of each of said pontoons for driving said vehicle through the water.

5. The amphibian vehicle of claim 1 wherein said pontoons each have an upwardly extending portion at the forward end thereof defining an upwardly inclined water engaging bottom surface adapted to urge said pontoon toward the water surface as said vehicle moves forwardly through the water.

6. The amphibian vehicle of claim 1 wherein said arm means includes at least one arm connecting each of said pontoons to said vehicle body, each of said arms including a pair of tubular members, one of said members slidably positioned within the other of said tubular members in a telescoping relationship, and wherein said means for selectively extending said arm means includes fluid cylinder means connecting said pair of tubular members to selectively control the telescopic relationship between said tubular members, the extending end of one of said tubular members pivotally connected to said wheeled vehicle for pivotal movement about a first axis generally parallel to a line joining the centers of said wheels associated with said arm, and the extending end of the other of said tubular members pivoted to said pontoon for pivotal movement about a horizontal axis generally normal to said line joining the centers of said wheels.

7. An amphibian vehicle as set forth in claim 6 wherein said wheeled vehicle includes a floatable body shell, and further including propulsion means mounted at the aft end of each of said pontoons for driving said vehicle through the water.

8. An amphibian vehicle as set forth in claim 7 wherein each of said pontoons define depressions in the upper portion thereof adapted to receive said wheels therein when said wheels rest on said pontoon.

9. An amphibian vehicle comprising:
a wheeled vehicle;
a pair of pontoons disposed on opposite sides of said wheeled vehicle;
linkage means connecting said pontoons to said vehicle for alternatively moving said pontoons to a first position directly below said wheels and to a second position out from under said wheels so that said wheels are in a ground engaging position, said linkage means preventing fore and aft movement of said pontoons at all times; and,
drive means operatively connected to said linkage means to alternatively drive same from said first position to said second position and from said second position too said first position, said drive means selectively releasing said linkage means in said first position to allow said wheels to rest directly on said pontoons and to move with said wheels so that the weight of said vehicle is supported by said pontoons through the normal suspension system of said vehicle.

* * * * *